J. SPEAR.
Flat Iron Heater.
No. 24,667.
Patented July 5, 1859.
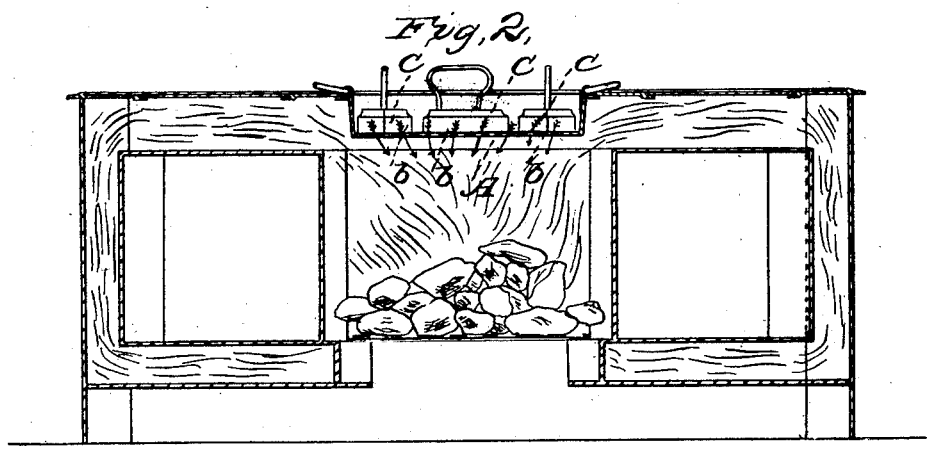
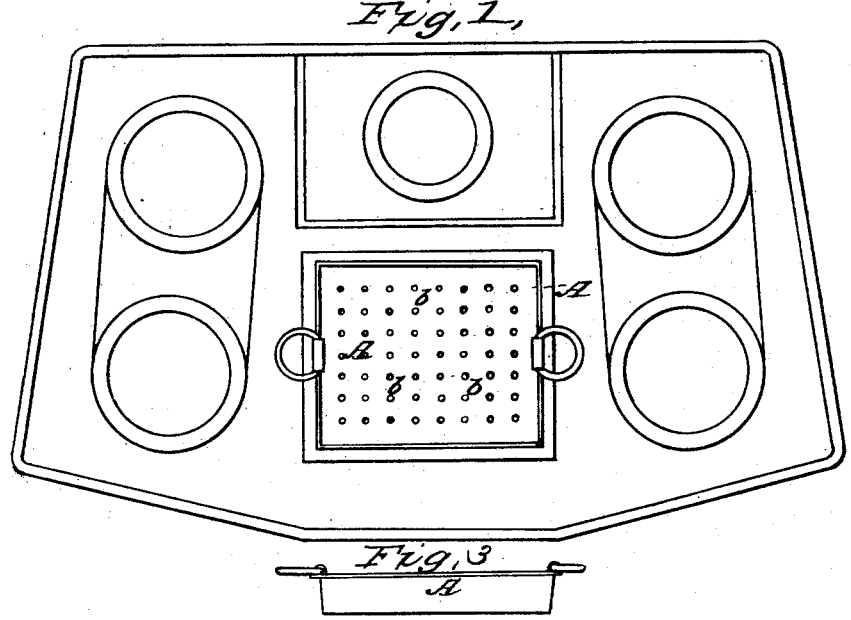
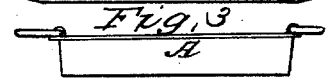
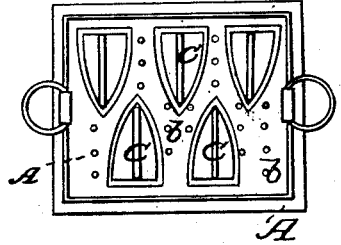
Witnesses:
Inventor:
James Spear.

UNITED STATES PATENT OFFICE.

JAMES SPEAR, OF PHILADELPHIA, PENNSYLVANIA.

IRONING-PAN FOR RANGES OR STOVES.

Specification of Letters Patent No. 24,667, dated July 5, 1859.

*To all whom it may concern:*

Be it known that I, JAMES SPEAR, of the city and county of Philadelphia and State of Pennsylvania, have invented a new and useful Improvement in Pans Used on Cooking Stoves and Ranges for the Purpose of Heating Flat-Irons; and I do hereby declare that the following is a full, clear, and exact description of the construction and operation of the same, reference being had to the annexed drawings, making a part of this specification, in which—

Figure 1 is a plan view of the range with the pan on it. Fig. 2, is a transverse section; Fig. 3, a side elevation of the pan; Fig. 4, a plan of the same with the flat irons on it.

Letters A A represent the pan; letters b, b, the perforations in the bottom of the pan; letters C, C the flat irons on the pan.

To enable others skilled in the art to make and use my invention I will proceed to describe its construction and operation.

It is a well known fact to all stove and range manufacturers, that the present mode of heating flat irons on stoves and ranges, is more injurious than any other work performed on a stove or range, and that the covers or pans used for this purpose, are very liable to warp, and sink down in the center, with the excessive heat, and weight of the flats. In order to avoid this objection I have constructed a pan of sheet, cast iron, or any other metal, with a perforated bottom, which will allow of a current of air to pass through the bottom of the pan into the fire as each flat is removed. This current of air passing through the bottom of the pan cools that portion of the pan and prevents it from becoming overheated and sinking down on the fire. As soon as the flat irons are placed on the pan it immediately heats up. Consequently the action or operation of heating and cooling is carried on during the process of ironing, which makes the pan more durable, and as this pan extends down closer to the fire, than the ordinary covers on the stoves and ranges, it requires a much less fire to heat the pan. Thus avoiding the excessive heat required in ironing in the ordinary way, making the stove or range much more comfortable in the warm weather. Also another important advantage is gained by the use of this perforated pan, that of admitting jets of air over the fire which aids in the combustion of the gaseous productions of the fuel, which with the use of the ordinary covers or pan, must pass off unconsumed thus making this improved pan a matter of economy.

What I claim and wish to secure by Letters Patent is—

An ironing pan, constructed with a perforated bottom in the manner and for the purpose described.

JAMES SPEAR.

Attest:
   JOHN S. HOLLINGSHEAD.
   S. H. SHAKSPEARE.